United States Patent [19]

Gilz et al.

[11] Patent Number: 4,612,450
[45] Date of Patent: Sep. 16, 1986

[54] METHOD OF SETTING A REFERENCE VALUE, FOR EXAMPLE TO ZERO-SET A SIGNAL SOURCE, PARTICULARLY A TRANSDUCER

[75] Inventors: Günter Gilz, Korschenbroich; Manfred Henning, Kaurst, both of Fed. Rep. of Germany

[73] Assignee: Bosch und Pierburg System Ohg, Neuss, Fed. Rep. of Germany

[21] Appl. No.: 587,499

[22] Filed: Mar. 9, 1984

[30] Foreign Application Priority Data

Apr. 2, 1983 [DE] Fed. Rep. of Germany ....... 3312027

[51] Int. Cl.⁴ ............................................. H03K 5/00
[52] U.S. Cl. .................................. 307/264; 307/359; 328/162
[58] Field of Search ...................... 307/264, 359, 362; 328/162, 165

[56] References Cited

U.S. PATENT DOCUMENTS 4,263,555  4/1981  Hunka ................................ 307/359

*Primary Examiner*—John Zazworsky
*Attorney, Agent, or Firm*—Frishauf, Holtz, Goodman & Woodward

[57] ABSTRACT

To zero or reference-set or null-set a signal source, typically a distance or rotary angle transducer (10), a closed control loop (11, 12, 13) is connected in the output (E) from the signal source, which includes feedback of the system output signal (A) and comparison thereof with a reference or null or zero-set signal (W) when the signal source or transducer is at the reference position, the closed control loop including a correction element (11), such as an adder, to correct the zero or null-set signal derived from the signal source in accordance with the operation of the control loop. This eliminates individual adjustment of the zero or null-set of the signal source, reducing costs and increasing accuracy of the zero or null-set. The correction signal is introduced at the time the signal source or transducer is at a zero or reference position, or the transducer can be preset to provide, initially, a signal which requires correction, and a diode (15) is introduced in the control loop so that the correction signal is effective only in one direction, thus permitting deviation of the transducer from its zero or reference position and not requiring a special switch (14) which renders effective the control loop when the transducer (10) is at the zero or reference position.

8 Claims, 2 Drawing Figures

METHOD OF SETTING A REFERENCE VALUE, FOR EXAMPLE TO ZERO-SET A SIGNAL SOURCE, PARTICULARLY A TRANSDUCER

The present invention relates to a system and to a method to set the zero point, or any other reference point, of a signal source, typically a signal source which is a transducer, to transduce a given parameter, such as a path or distance length, a rotary angle, or the like.

BACKGROUND

Signal sources, for example path or rotary angle tranducers which provide output signals representative of a distance traveled by an element or a rotary deflection of a shaft usually provide a signal which is representative of a reference point or, typically, a zero point. The output signal which represents this reference or zero point must be calibrated, so that the deflection of the transducer from the zero or reference point can be accurately determined by reference to the transducer signal. Calibrating and adjusting the zero point is costly and, particularly if the transducers are made under mass-production conditions, may require individual adjustment on many elements due to manufacturing tolerances. Calibrating mass-produced transducers, thus, and later on maintaining the adjustment during operation, is a continuous and costly problem.

THE INVENTION

It is an object to so construct and operate a signal source, particularly a transducer, that the zero point, or any other reference point adjustment, will not be necessary with respect to the individual elements, in other words, to so arrange the signal source that it will automatically provide the proper zero or reference signal when the signal source, or a transducer, is at a zero or reference position.

Briefly, the signal source is coupled to a closed control loop which receives as a comparison input a reference signal, for example a zero-set signal, in which the output from the transducer is compared, and, if an error occurs, provides an error signal which is added into the output signal from the transducer until the loop is in balance. As soon as the loop is in balance, the correction will automatically be set and maintained since, at that point, the error signal will be automatically zero due to the match of the output signal from the system with the reference signal. The reference signal may, for example, be a zero-set signal.

The system can be easily arranged to zero-set various signal sources. If the zero or reference setting is the minimum setting, the error or deviation signal from the comparator can be applied through a diode so that correction in only one direction will be effected, to always reset the signal source to the reference level, any signals in excess thereof being derived from the signal source not affecting the control loop due to the blocking action of the diode, which is poled to prevent regulating action of the control loop in one direction.

The system has the advantage that the zero or reference setting of the signal source will occur automatically upon application of a reference signal, so that an accurate zero setting or reference setting is obtained of the system as a whole, without specifically calibrating or adjusting the signal source, typically a transducer.

DRAWING

FIG. 1 is a schematic circuit diagram of the system in which zero setting signal is applied and which includes a switch for rendering the system effective when the zero setting is to be carried out; and FIG. 2 is a circuit diagram illustrating the system, in which zero-setting signals can be continuously applied if the system is arranged for signals which vary from the zero signal in one direction or polarity only.

DETAILED DESCRIPTION

Figure 1:
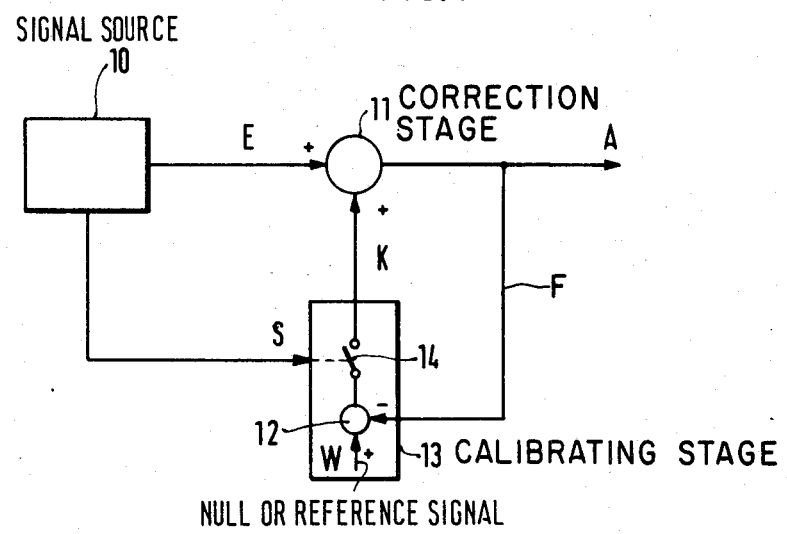

The invention will be described in connection with a transducer providing an output signal representative of a distance or path from a certain reference, hereinafter the zero or null position of the transducer.

A signal source 10, shown as a path or angle transducer, provides an output signal E. The output signal E is applied to a signal modifying or signal correction stage 11, shown as an adder 11. The output signal A from the correction—adder stage 11 forms the output signal from the transducer 10, calibrated with respect to a reference or zero set. The output signal is branched and connected to a comparator 12 of a zero-set calibrating stage 13. The comparator 12 receives a reference or null or zero setting signal W. This is the command or zero-set signal. The output from the comparator, then, when the signal source 10 is to be at the reference position, will be a correction signal K. When the signal source 10 is to supply the output representative of null or zero-setting thereof, the switch 14 connected between the comparator 12 and the correction input of the correction—adder stage 11 is closed. The null position of the source 10, for example of the transducer, is signalled to the switch 14 through a connection S. Consequently, switch 14, a controlled switch shown schematically as a mechanical switch but which, of course, may be an electronic switch, is closed when the transducer 10 is at its zero or null position.

Operation: When the signal source, typically a transducer 10, is at its zero or null position, the signal S is generated, closing switch 14. This, then, renders the closed control loop: 11—A—13—K—11 effective. The closed control loop will then modify the signal E so that the output signal A will have the value W. This value W, in the simplest case, may have the value of zero or null; any other desired or selected reference value may, however, also be used for the signal W. The correction signal K generated by the comparator 12 is applied through the switch—assuming the signal source being at the null or zero position—to the correction—adder stage 11 to thereby modify the output signal E from the signal source and provide the null or zero or reference-set output signal A. As soon as the system has stabilized, that is, when the output signal A has a value equal to the reference signal W, which may be a zero or null signal, the correction signal K will become zero or null. The switch 14 is opened since the signal K has become zero—because the two comparison inputs to the comparator 12 are now in balance.

The set position of the correction—adder stage 11 is then maintained i.e. the stage maintains the value of K set before A reached W and opened switch 14.

Figure 2:
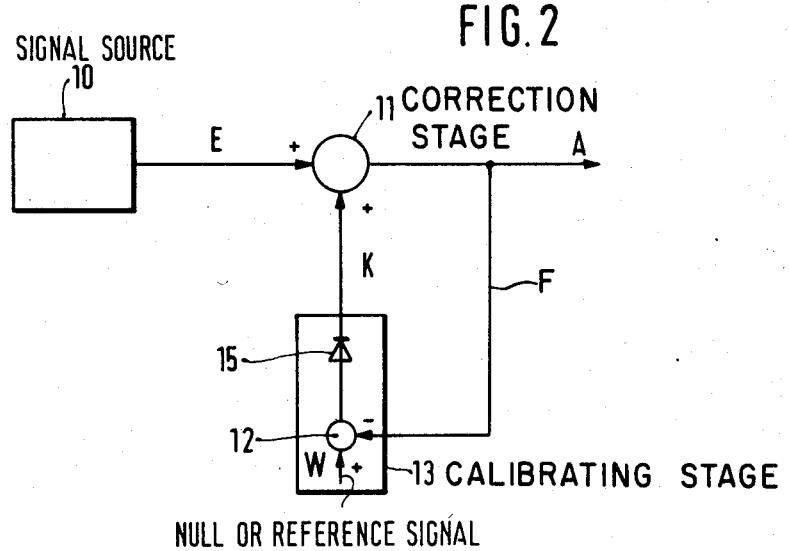

Embodiment of FIG. 2: The system is similar to that of FIG. 1, and similar elements have been given the same reference numerals.

The embodiment of FIG. 2 is particularly suitable for situations in which the signal source 10 does not generate a zero signal. In such a situation, the zero point is defined by the output signal A passing below a predetermined value W. The switch 14 is replaced by a diode 15 in the embodiment of FIG. 2, the diode being so poled that only positive correction signals K can be applied to the correction—adder stage 11.

Operation, FIG. 2: A positive correction signal is present only in the zero point position, that is, when the value of the signal A is below the value of the signal W. In that case, the diode 15 is conductive, and the output signal A is controlled to have the value of the null or reference signal W. When the signal source 10 provides a higher output signal, for example due to deflection of the transducer 10 from a zero-set angular position—the zero-set condition no longer pertains and the output signal from terminal A, upon comparison with the null or reference signal W, will cause a correction signal to be applied to the diode which is in the blocking direction of the diode. Thus, since the diode 15 will block, no further correction signal will be applied to the correction-adder stage, so that the output signal A, corrected only for the zero position, will truly reflect the deflection or output signal from the signal source 10. Upon blocking of the diode 15, the correction signal K which will, be applied by the correction-adder stage 11 is only that signal which relates to the zero or null position, that is, the highest value which could be passed by the diode.

When the system of FIG. 2 is first started, the correction value K must be set to a predetermined level since it can change, under the influence of the feedback loop (F) from the output circuit, only in a positive direction.

The system of the invention is suitable primarily for transducers which transduce a physical parameter, for example path length, rotary angles, or the like; other physical parameters may also be transduced. The invention is not limited to such structures, however, and may be used, in principle, to zero-set or reference-set any signal source in which the deviation of the signal from the zero or reference setting is controlled in accordance with a desired parameter or external control signal.

Various changes and modifications may be made, and any features described herein may be used with any of the others, within the scope of the inventive concept.

We claim:

1. A method, of calibrating a signal source by adjusting its output signal (E) to a desired reference value (W) particularly of setting a zero output signal of a transducer apparatus disposed in a zero position, comprising the steps of initially passing said source output signal (E) essentially unchanged through a correction stage (11) to produce a system output signal (A);
   providing a reference signal (W);
   comparing said system output signal (A) to said reference signal (W) and determining whether they have equal values;
   if said values are unequal, providing a correction signal (K) as a function of the comparison between the system output signal (A) and the reference signal (W), and setting the value of said correction signal (K) into said correction stage (11);
   combining said correction signal (K) and said source output signal (E) in said correction stage (11) to produce a modified system output signal (A);
   comparing said modified system output signal (A) to said reference signal (W) to determine whether they have equal values;
   and, if said values are equal, maintaining said correction signal (K) value setting in said correction stage (11) and ceasing application of further correction signals thereto.

2. Method according to claim 1, including the step of applying the correction signal only when the signal source is at a zero or null or reference position.

3. Method according to claim 1, including the step of setting the source signal, when the source is at a reference position, at a level different from the level of the system output signal when the signal source is at the reference or null position;
   and controlling the correction signal to permit correction only in the direction or polarity in which the system output signal (A) will correspond to a desired zero or null or reference output signal by interconnecting a unidirectional conductive element or diode (15) in the path of the correction signal, thereby permitting generation of signals by the signal source in a direction causing the unidirectional element or diode to block without affecting the system output signal.

4. A method according to claim 1, wherein said step of ceasing application of further correction signals comprises opening a switch (14) carrying said correction signal (K) to said correction stage (11).

5. A method according to claim 1, wherein said step of ceasing application of further correction signals comprises blocking a diode (15) through which said correction signal (K) passes to said correction stage (11).

6. A method according to claim 5, wherein said blocking steps occurs whenever the value of said system output signal (A) exceeds the value of said reference signal (W).

7. A method according to claim 1, further comprising an initial step of physically adjusting said signal source to a null position.

8. A method according to claim 4, further comprising initial steps of physically adjusting said signal source to a null position and closing said switch (14).

* * * * *